United States Patent [19]
Schwartz et al.

[11] Patent Number: 5,189,360
[45] Date of Patent: Feb. 23, 1993

[54] METHOD AND APPARATUS FOR PROVIDING CONTROLLED MECHANICAL BRAKING TORQUE

[75] Inventors: Rodney E. Schwartz, Tempe; Steven T. Clauter, Scottsdale, both of Ariz.

[73] Assignee: Integrated Technology Corporation, Tempe, Ariz.

[21] Appl. No.: 335,791

[22] Filed: Mar. 27, 1989

[51] Int. Cl.⁵ .......................... H02P 9/00; H02P 3/00
[52] U.S. Cl. ...................................... 322/25; 322/80; 322/100; 318/382
[58] Field of Search ........................ 322/10, 29, 35, 32, 322/40, 25, 80, 100; 320/14; 318/382

[56] References Cited

U.S. PATENT DOCUMENTS

| | | | |
|---|---|---|---|
| 2,721,305 | 10/1955 | Steinitz | 322/32 X |
| 2,767,367 | 10/1956 | Black | 322/32 |
| 3,230,381 | 1/1966 | Grinnell et al. | 322/40 X |
| 3,947,744 | 3/1976 | Grace et al. | 320/14 X |
| 3,974,396 | 8/1976 | Schonball | 318/382 X |
| 4,326,158 | 4/1982 | Helgesen | 322/40 X |
| 4,423,363 | 12/1983 | Clark et al. | 318/375 |
| 4,636,707 | 1/1987 | Law | 322/35 |
| 4,720,666 | 1/1988 | Yokota | 322/10 |

Primary Examiner—R. J. Hickey
Attorney, Agent, or Firm—Renner, Otto, Boisselle & Sklar

[57] ABSTRACT

Apparatus and method for electrically generating mechanical braking torque employs direct field drive incorporating an AC alternator plus a current regulator. The stator windings of the alternator are directly coupled to the field winding via a full wave rectifier and the current regulator. The invention simplifies electrical circuitry for generating braking torque, provides wide dynamic range of torque generation, limits voltages and currents to easily manageable levels, and reduces mechanical drive train requirements. The invention produces a constant power mechanical load from essentially 0 to over 1,000 watts from an alternator of the size typically used for automotive applications.

15 Claims, 3 Drawing Sheets

METHOD AND APPARATUS FOR PROVIDING CONTROLLED MECHANICAL BRAKING TORQUE

TECHNICAL FIELD

The invention relates generally, as is indicated, to method and apparatus for providing controlled braking torque, and, more particularly, to providing such braking torque for mechanical systems.

BACKGROUND

The prior art electrical means of generating mechanical braking torque have generally involved application of alternators, generators, motors, eddy current drives, and magnetic brakes. These traditional designs are all limited due to the relatively high cost of the required components, circuit complexity, large physical size, power dissipation, and restricted speed and torque ranges. Often high electrical currents and large voltage pulses have resulted in poor reliability and also emitted large quantities of electromagnetic interference (EMI). Audible noise as well as mechanical vibration and the associated power losses have further reduced the effectiveness of these conventional torque generating devices due to rotational components in the drive lines and the requirement for large gear ratios. With this background, it is apparent that a new method of braking torque generation is required.

In one conventional electronic device for providing mechanical braking torque, an alternator is used with two electronic regulators typically being required, one to maintain a constant output voltage from the alternator and a second to regulate the load current flowing through a load resistor. Voltage and current are separately regulated. The total power dissipation is the product of the output voltage times the load current. There are a number of disadvantages to such prior art devices, including, for example, instability and reliability, circuit complexity, high alternator output currents under heavy loads, high power dissipation in general and usually confinement of power dissipation to parts that have small surface areas and, therefore, excessively heat, poor low rpm performance, small dynamic load range, and large initial mechanical load.

BRIEF SUMMARY OF THE INVENTION

Briefly, in the electrical apparatus for generating a mechanical braking torque according to the present invention, an AC alternator with a rectified DC output is coupled to a current regulator which controls the amount of current which flows from the alternator stator output and back into the field of the alternator. Current induced in the stator flows back into the field winding after being regulated, and since the current is regulated and the electrical resistance of the stator and field are fixed, the total power dissipation is the square of the current times the total resistance of both the stator and field. Thus, induced current is used for both exciting the field winding and generating the braking torque.

The invention also relates to a method of generating a mechanical braking torque by generating an electrical output as a function of a mechanical input, controlling such electrical output, and using such electrical output to apply braking torque to such mechanical input.

According to an aspect of the invention, the mechanical braking torque is a function of current flow and total electrical resistance, on the one hand, and rpm (revolutions per minute), e.g. speed of the device intended to be braked.

Advantages of the invention include the ability to use smaller gauge wire than had previously been required for electrical devices to produce braking torque, facilitating removal of heat because heat is generated in the stator winding where it is more easily removed, and more torque can be generated at lower field rpm than had been possible in the past due to the higher torque constant (K-T) achieved. The term "K-T" represents torque constant; it is the measure of how much mechanical torque is required to turn the brake for a given amount of electrical current. Units typically are Foot-pounds per ampere.

The foregoing and other objects, aspects, features and advantages of the invention will become more apparent from the following description and associated drawings. It will be appreciated that the present invention is described in detail with respect to a preferred embodiment; however, the scope of the invention is defined in the claims and equivalents thereof.

To the accomplishment of the foregoing and related ends, the invention, then, comprises the features hereinafter fully described in the specification and particularly pointed out in the claims, the following description and the annexed drawings setting forth in detail a certain illustrative embodiment of the invention, this being indicative, however, of but one of the various ways in which the principles of the invention may be employed.

DESCRIPTION OF EXEMPLARY PRIOR ART APPARATUS

Figure 1:
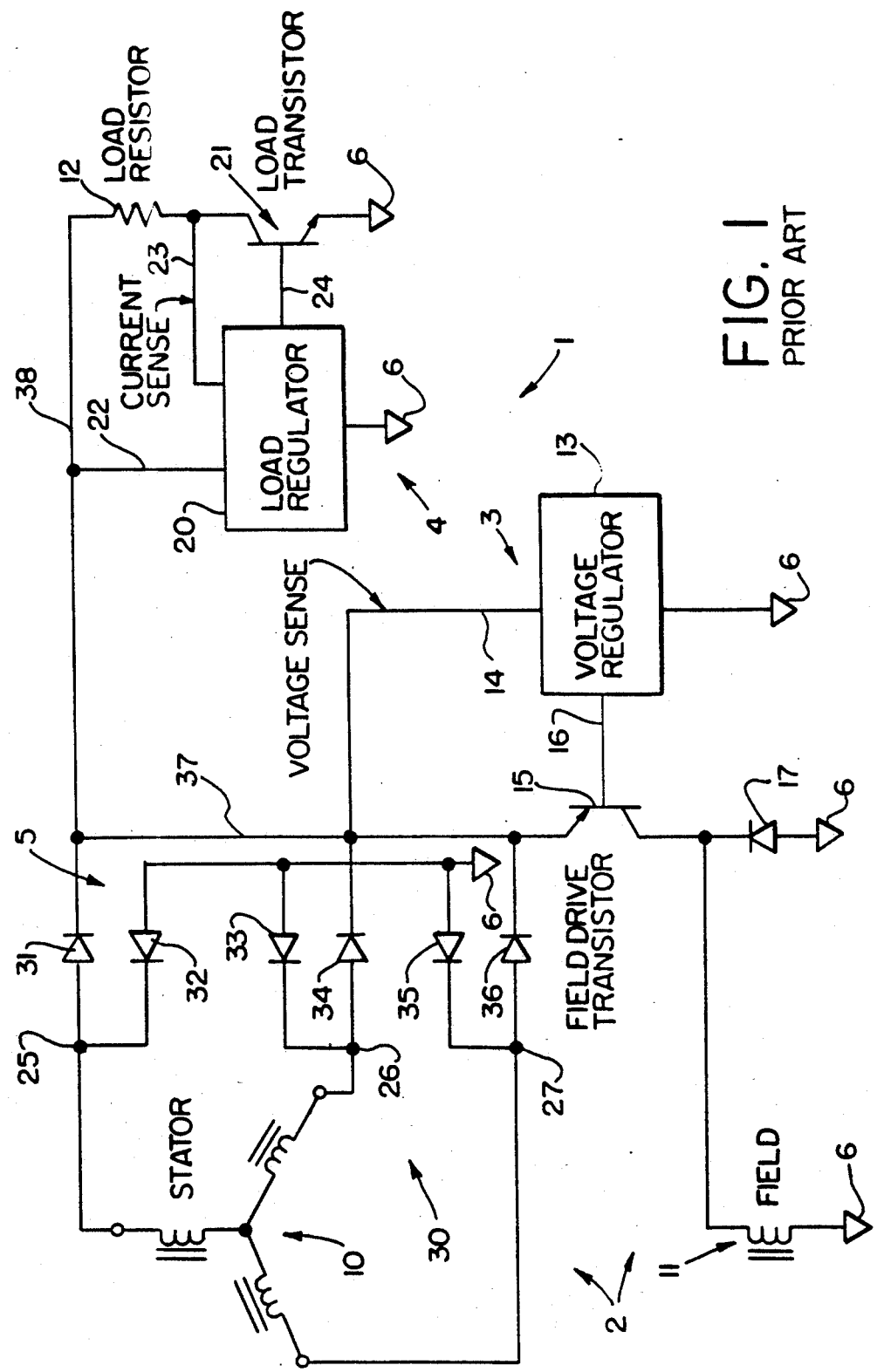
FIG. 1 is a schematic illustration of a prior art apparatus using an alternator to maintain a constant power load for generating a mechanical braking torque.

Referring to FIG. 1, a prior art electrical circuit apparatus 1 for generating mechanical braking torque is illustrated. The apparatus 1 includes an alternator 2, two regulator devices or circuits 3, 4, a bridge rectifier assembly 5 and the various ground or common connections 6. The alternator 2 includes a three phase stator 10 and a field 11, as is well known.

One of the regulator circuits 3, for example, is a voltage regulator intended to regulate the output voltage from the alternator 2. The other regulator circuit 4 is a current regulator intended to regulate the load current flowing through a load resistor 12 thereof. The voltage regulator circuit 3 includes a conventional electronic voltage regulator 13 having a voltage sensing input connection or lead 14 coupled to the output side of the rectifier 5 to sense the output voltage from the alternator stator. The voltage regulator circuit 3 also includes a field drive transistor 15, the base of which is controlled by the output 16 from the electronic voltage regulator 13. The field drive transistor 15 is coupled (as is illustrated, the emitter of the transistor) to the output side of the rectifier 5 to receive the output voltage of the stator 10 and to the field 11 (at the collector of the transistor). The electronic voltage regulator 13 may be a standard pulse width modulation type of device well known in the industry which provides a constant frequency, variable pulse width drive via the output 16 thereof to the field drive or "pass" transistor 15. A flyback diode 17 also is coupled between ground and the junction of the field 11 and the field drive transistor 15.

The current regulator circuit 4 includes the load resistor 12, an electronic load regulator 20, and a load transistor 21. The load regulator 20 includes a voltage input connection or lead 22 to the output side of the bridge rectifier assembly 5, a current sensing input connection or lead 23 coupled to the junction of the load resistor 12 and the load transistor 21, and an output 24 coupled to the base of the load transistor 21 to control the latter. The electronic load regulator is a standard linear type device, and is operative to bias the base input of the load (or pass) transistor 21. The bias, or drive level, on line 24 is a function of the voltage at the junction of the load resistor 12 and load transistor 21; such voltage is a function of current through the load resistor 12 and is coupled to the load regulator via line 23.

In the apparatus 1, the regulators 13, 20 are of the type and are coupled according to those used in a conventional automotive type of regulator system that maintains 12 volt DC output from the alternator 2. Total power dissipation is the product of the output voltage at the output of the bridge rectifier assembly 5 and the load current through the load resistor 12.

During operation of the apparatus 1 of FIG. 1, the stator 10, which is illustrated as a three phase stator, provides three phase AC voltage to nodes 25, 26, 27 at the input 30 of the bridge rectifier assembly 5. Such three phase voltage is rectified by the rectifier (more specifically by the diodes 31–36 thereof) and is provided as a positive voltage at the output 37 of the bridge rectifier assembly 5 with respect to the ground (or other common potential) connection 6. The electronic voltage regulator 13 senses the voltage at the output 37 of the bridge rectifier assembly 5 with respect to ground 6 and increases or decreases the pulse width of the signal on output 16 delivered to the base of the field drive transistor 15 to maintain a constant voltage from output 37 relative to ground 6 by the corresponding increase (or decrease) in drive to the alternator field winding 11.

The flyback diode 17 is connected between the junction of field drive transistor 15 and field 11 and the ground 6. The flyback diode 17 prevents damaging reverse voltages from occurring across the field drive transistor 15 and the switching voltage regulator 13 during the OFF time of the pulse width modulated cycle.

A constant current load is provided to the output 37 of the bridge rectifier assembly 5 by the load regulator circuit 4. The load resistor 12 is used to sense the load current in line 38. The electronic load regulator 20 adjusts the bias current to the base input of the load transistor 21 to maintain the load current constant, as is well known.

With both current through the load resistor 12 and voltage at the output 37 of the bridge rectifier assembly 5 maintained at a constant level, then, the power output of the alternator 2 is constant and a constant load torque is presented at the rotating shaft (not shown) of the alternator 2. The setpoint of the load regulator 20 may be changed to vary the torque, as may be required.

A number of disadvantages inure to the prior art apparatus 1 described above. The circuitry is relatively complex due to the need for two separate electronic regulators, and, therefore, the control circuitry may lack stability and reliability under all load conditions. Under heavy loads alternator output currents are high, for example, under a 300 watt load the alternator must output 25 amps, that is, 12 volts times 25 amps equals 300 watts.

Power dissipation in the load regulator 20 is high, for example, at one half the maximum power point the load current regulator is dissipating as much power as the load resistor. In this regard, note that the size of the load resistor is equal to 12 volts divided by the maximum design current of 25 amperes (Load Resistor = 12 V/25 A), namely, 0.48 ohms. Therefore at 12.5 amperes (one half the maximum design current) the load resistor power equals the current squared times the resistance of the load resistor (Load resistor power = $I^2*R$), namely $[(12.5)^2]*0.48 = 75$ watts.

Figure 3:
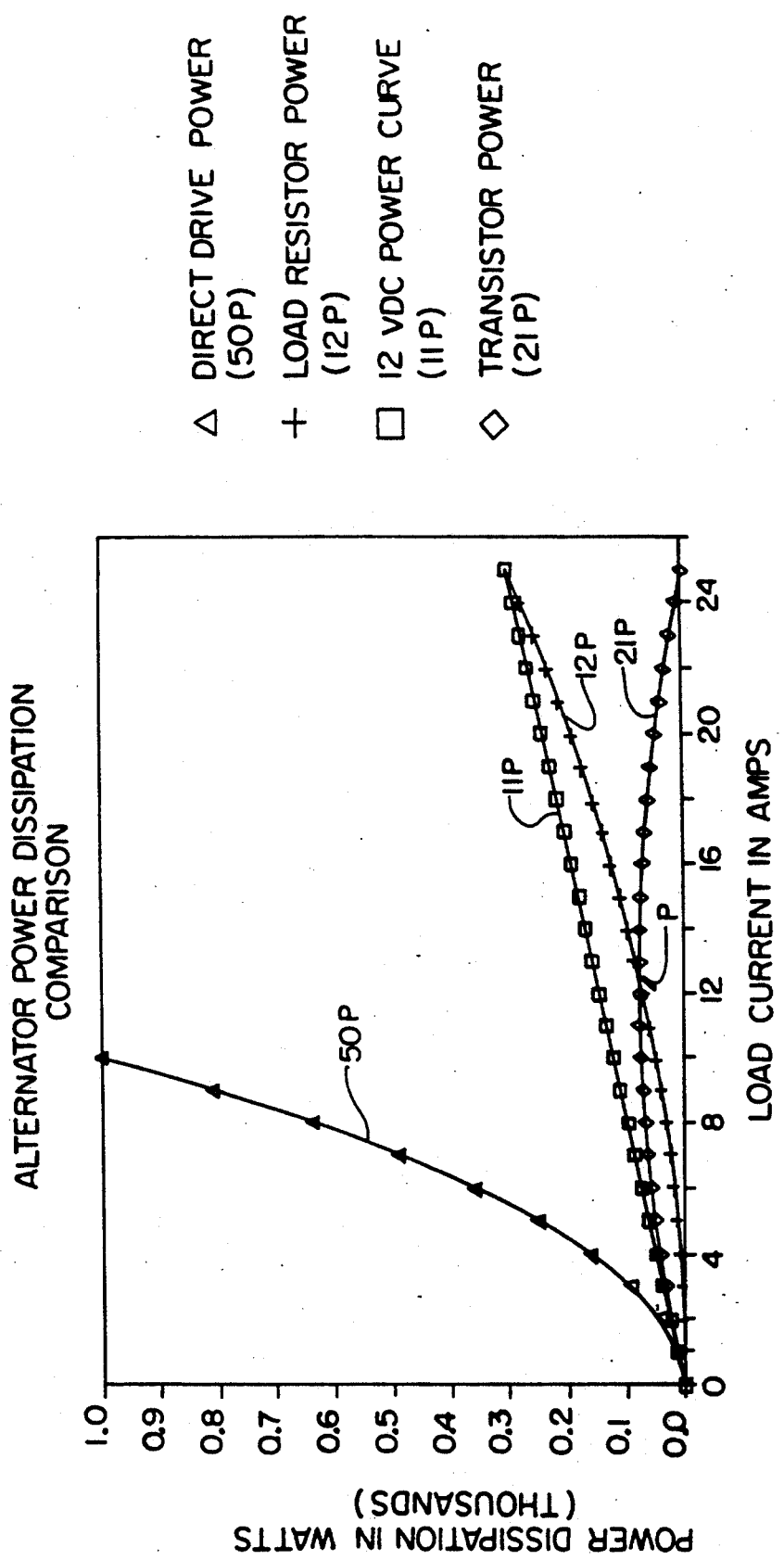
FIG. 3 is a graph depicting power dissipation with respect to current in a number of components.

In the graph of FIG. 3 are illustrated curve 21P representing power dissipation in the load transistor 21, curve 12P representing power dissipation in the load resistor 12P, and curve 11P representing power dissipation in the field 11. From the graph of FIG. 3, the half-power point P is seen to be the same as the maximum power point for the load transistor 21. Note, too, the current flowing through the load resistor 12 and the load transistor 21 is completely separate from the current flowing through the field winding 11.

Moreover, since power dissipation is confined to parts with small surface areas such parts heat up to very high undesirable temperatures. For example, the load resistor 12, load transistor 21, and the bias circuitry in the load regulator 20 will heat up and require considerable heat-sinking. The load transistor 21 in particular is a very confined surface area device, well under one square inch. BY contrast, the direct drive alternator technique of the present invent±on will dissipate this same power through the field and stator windings with a surface area on the order of 100 square inches, as will be described in further detail below; in fact, according to the invention, the alternator of the invention may employ forced ventilation, which will further increase heat dissipation. Since the field drive is limited, for example, to a 12 volts DC source, alternator performance is poor at relatively low rpm's. Additionally, the dynamic load range is relatively small; the maximum load is fixed by the square of the voltage divided by the load resistance. Finally, there is a relatively large initial mechanical load due to the small torque constant of the alternator requiring the alternator rpm to be kept relatively high.

DESCRIPTION OF THE PREFERRED EMBODIMENT

Figure 2:
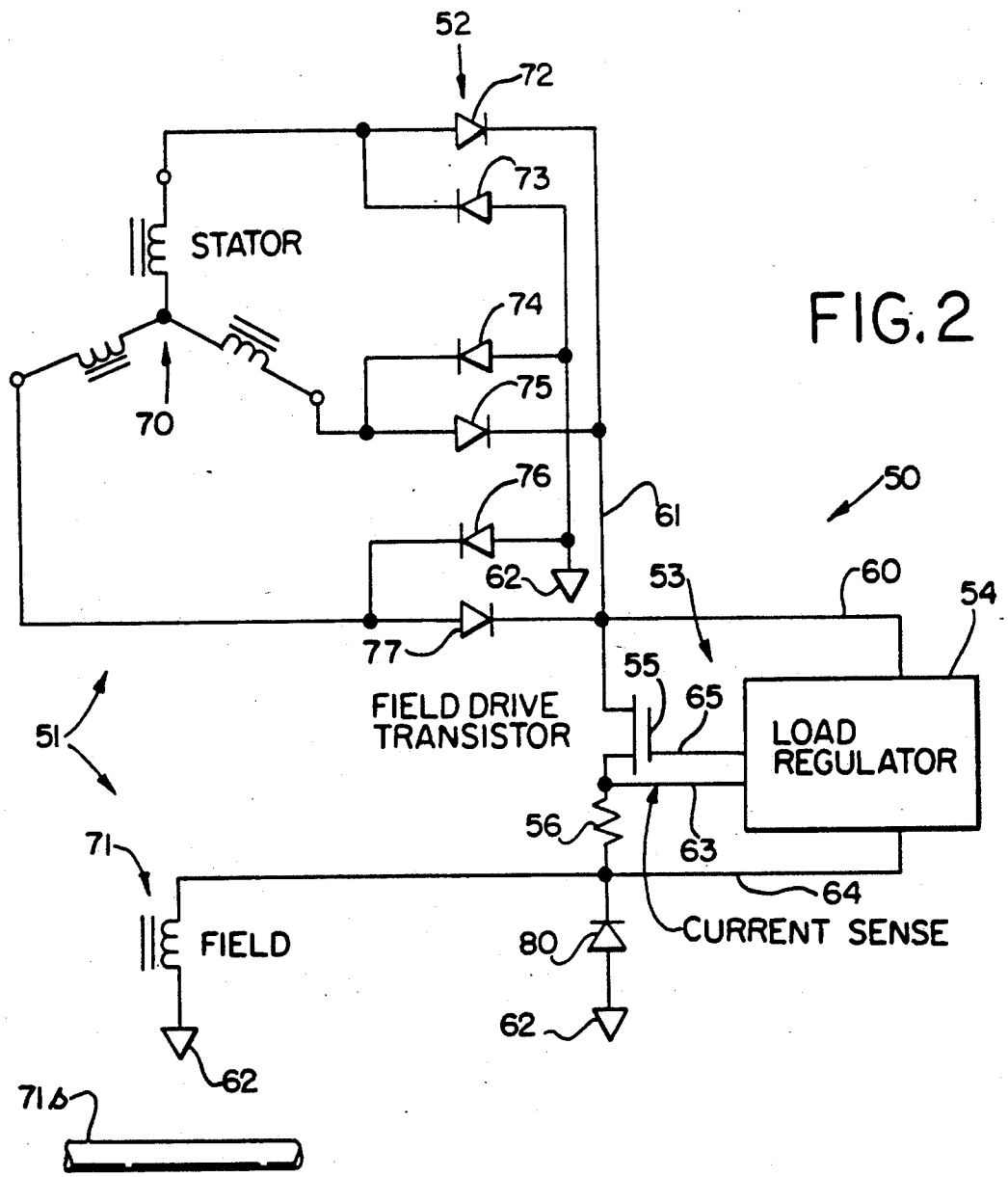
FIG. 2 is a schematic illustration of an apparatus according to the invention using a direct field drive to generate braking torque and to obtain a constant power load.

An electrical apparatus 50 for generating a mechanical braking torque according to the present invention is illustrated in FIG. 2. The apparatus 50 includes an AC alternator 51, a bridge rectifier assembly 52, and a regulator 53. The regulator 53 preferably includes an electronic pulse width modulation type regulator 54, e.g., as the regulator 13, 20 mentioned above, which is well known in the industry, and a field drive (pass) transistor 55, which preferably is a power MOSFET (metal oxide substrate field effect transistor) device. A MOSFET device simplifies the overall circuitry, reduces power losses and lowers cost. The regulator 53 also includes a current sensing resistor 56. The regulator has an input lead 60, which is coupled to the output 61 of the bridge rectifier assembly 52 to receive input voltage therefrom relative to a ground or other common connection 62, and also includes a pair of input leads 63, 64, which are coupled across the current sensing resistor 56 to provide as an input to the regulator 54 a voltage that is proportionally representative of the current flowing through the resistor 56. An output lead 65 from the regulator 54 is coupled to the gate of the field drive transistor 55 to provide a pulse width modulated control signal thereto accordingly controlling the current flow through such transistor.

In the apparatus 50 the alternator 51 includes a three phase stator 70, although more or fewer phases may be employed, and a single field winding 71, although more may be used, as will be appreciated to those having ordinary skill in the art. The field 71 is mounted on a shaft 71s and rotates relative to the stator to induce a signal in the several stator windings. Such signal would be a three phase AC voltage in the illustrated three phase system, although more or fewer phases may be employed and changes common to the alternator technology, e.g., the number and identification of the parts that actually move relative to others may be varied, as is well known.

The three phase AC voltage produced by the respective stator windings is rectified by the bridge rectifier assembly 52, which preferably is a full wave rectifier employing a plurality of diodes 72–77 (although a half wave rectifier may be used, if desired). A rectified positive DC voltage then is provided the output 61 of the bridge rectifier assembly 52 by the diodes with respect to the ground 62.

The current through the alternator stator windings 70 and the alternator field winding 71 is regulated by the regulator 53. More specifically, such current is regulated by the load regulator 54, sometimes referred to as a switching current regulator, in combination with the field drive transistor 55 and the current sensing resistor 56. The output of the switching current regulator 54 provides variable pulse width voltage drive via the gate drive line 65. The flyback diode 80 connected in parallel with the alternator field winding 71 is to prevent damaging reverse voltages from occurring across the field drive transistor 55 and the switching current regulator 54 during the off cycle of the pulse width modulated drive signal on line 65.

The current sensing resistor 56 senses the current flowing through the alternator stator windings 70 and field winding 71 and feeds back to the switching current regulator 54 a voltage equivalent to such current flow. The pulse width output of the regulator 54 is adjusted to maintain the current flow through such windings equal to a setpoint value.

The setpoint can be either manually or automatically set to determine the output power. Use of a pulse width modulation (PWM) control signal through an optical coupler (optocoupler) is an exemplary way to automatically interface the setpoint to the load regulator 54.

The power dissipated by the alternator 51 is determined by the square of the current in the stator windings 70 and the field windings 71 times the electrical resistance in the stator 70 and field windings 71. The load power at the rotating shaft input to the alternator 51 is thus directly proportional to the magnitude of the square of the regulated current.

According to the preferred embodiment of the invention, one electronic current regulator 53 controls the amount of current which flows from the alternator stator 70 output and back into the field 71 of the alternator. No other external power resistors or transistors are required. By adjusting the stator windings 70 of the alternator 51, the amount of braking torque can be altered. For example, the number of turns, the wire gage, and the type of wire materials in the stator may be adjusted.

In operation of the apparatus 50, all the current induced in the stator 70 also flows back into the field 71 of the alternator 51. Since the current is regulated and the electrical resistance of the stator and field are fixed, the total power dissipation is simply the square of the current times the total resistance of both the stator and field. Conventional automotive stator windings therefore can be replaced with more windings of a smaller gauge wire. The dual effect of the new stator windings, i.e., smaller gauge, is more electrical resistance and an increased torque constant for the alternator 51. Accordingly, the alternator 51 dissipates most of the generated power in the stator windings 70 where heat is easily removed. Because of the higher torque constant, K-T, the alternator 51 can generate more torque at lower field rpm's. Since the number of windings is increased, the torque constant K-T will increse. This is a measure of the amount of mechanical torque produced by a specified amount of electrical current. With more windings there is more magnetic interaction and hence more torque. Also associated with this alternator is the K-V or voltage constant, which is a measure of the voltage per thousand rpm's. When the windings are increased, the K-V will also rise because more windings are being cut by the lines of magnetic flux. It will be appreciated, then, that according to the invention, the induced current is used for both exciting the field and generating the braking torque.

It is noted here that in accordance with the present invention electrical power ($P_E$) is a function of the square of the current times (I) the total combined electrical resistance (R), namely $P_E = I^2 \ast R$. Also, mechanical power ($P_M$) equals the product of the torque (T) and rpm, namely $P_M = T \ast \text{rpm}$. Setting the preceding two equations equal to each other yields the following relationship:

$$T \ast \text{rpm} = I^2 \ast R, \text{ or}$$

$$T = (I^2 \ast R)/\text{rpm}.$$

Note that the stator and field current are the same and the voltages are not important in view of the above relationships. What is important is that the braking torque is a function of the square of the current times the resistance divided by the speed.

During operation the electronic switching current regulator 54 maintains a constant current from the alternator 51. Since the regulator 54 is a switching regulator, power losses in the electronics are minimized because standard transistors and design techniques may be utilized. The regulator 54 also protects the alternator from short circuits and sets maximum current limit out of the alternator 54 so that the alternator is protected under all conditions even those occurring at very high alternator shaft rpm's without stressing the electronic parts or losing braking torque control. It should be noted that since there is only one controlling load regulator 54 involved, that the alternator 51 and control circuitry 50 will be protected under all operating conditions. Further, the output current is confined to a single conductive path from the output of the alternator 51, i.e., at output 61 of the bridge rectifier assembly 52, through the regulator 53 and back into the field 71 of the alternator; this minimizes the required size and cost of the conductors and the EMI that is emitted by the apparatus 50.

Particular advantages of the present invention include the need for only a single electronic regulator circuit to maintain constant power output from the alternator, thus, reducing the cost and complexity of the apparatus 1. Moreover, alternator currents are reduced, for example, to as little as 5.5 amps for a typical direct field drive (DFD) system or apparatus 50 of the present invention. In the 5.5 amps example, a 300 watt load can be produced with an alternator resistance of 10 ohms. This is an arbitrary example but it illustrates the importance that the DFD technique varies power not proportionally with current, but by the square of the current. Therefore, the amount of current needed to dissipate a specified mechanical load will be much lower than prior art techniques. There is virtually no power dissipation in the current regulator 53 so the circuitry thereof is much simpler and is more reliable than prior art electronic braking devices. The two regulators 53 and 4 are different. Although both regulate current, regulator 54 is referenced to the field node 64 and "floats" with respect to the common ground 62. Because a current sense resistor is used, the regulated current is independent of the alternator voltage. The regulator 4 is referenced to common ground 6 and assumes a constant, fixed voltage; there is no current sense resistor. Since power is dissipated in the physically large, heavy parts of the alternator 51 in which there already is substantial air flow and surface area, heat is spread out and easily removed so that operating temperatures will be reduced further increasing reliability and stability and lowering cost. Due to direct field drive, the alternator 51 can be operated at the lowest possible shaft rpm. In particular, in the graph of FIG. 3 there are two examples of power dissipation capabilities of an alternator; curve 11P represents power dissipation capability for the prior art alternator design, e.g., as is illustrated in FIG. 1, along with the associated power transistor 21P and power resistor 12P power dissipation. Curve 50P represents power dissipation for the DFD design of the apparatus 50 of the present invention. Note the dynamic range for the apparatus 50 as is represented by the curve 50P is rather large because the power dissipation is due to the square of the current.

For one example of the wide dynamic range of the apparatus 50, with an alternator 51 having a total of 10 ohms internal impedance, as the current is adjusted from 1 to 10 amps, the power dissipation ranges from 10 to 1000 watts. Short term peak power outputs in excess of the steady state capabilities are easily supported. Furthermore, because of the low operating rpm's, the mechanical gear ratio may be reduced resulting in fewer mechanical losses in the system.

STATEMENT OF INDUSTRIAL APPLICATION

It will be appreciated that the apparatus 50 of the invention may be used to provide a controlled mechanical braking torque for various applications.

The embodiments of the invention in which an exclusive property or privilege is claimed is defined, as follows:

1. Electrical apparatus for generating a mechanical braking torque, comprising
   AC alternator means having a stator and a field winding for generating an electrical output as a function of a mechanical input, said stator having highly resistive windings,
   rectifier means for rectifying the output from said AC alternator means to provide a rectified DC output,
   means for coupling said rectified DC output to said field winding whereby substantially all of the current induced in said stator flows back into said field winding so as to generate said mechanical braking torque over the intended range of operation of said alternator means, and
   current regulator means for regulating the amount of current which flows between said stator and said field winding in order to control the amount of said mechanical braking torque.

2. The apparatus of claim 1, wherein said induced current is used for both exciting the field winding and generating the braking torque.

3. The apparatus of claim 1, wherein said current regulator means consists of a single load regulator.

4. The apparatus of claim 1, wherein said current regulator means comprises a pulse width modulator.

5. The apparatus of claim 4, wherein said current regulator means further comprises a field drive transistor for controlling the current from the stator to the field of said alternator means.

6. A method of generating a mechanical braking torque, comprising:
   generating an electrical output from an alternator as a function of a mechanical input, said alternator comprising a stator having highly resistive windings,
   regulating the amount of current which flows from the alternator output and back into the field winding of the alternator, and
   directing substantially all of the current induced in the stator back into the field winding in order to effect said mechanical braking torque over the intended range of operation of said alternator.

7. An electrical apparatus for generating a mechanical braking torque, comprising
   AC alternator means having a stator and a field winding for generating an electrical output as a function of a mechanical input,
   rectifier means for rectifying the output from said AC alternator means to provide a rectified DC output,
   means for coupling said rectified DC output to said field winding whereby substantially all of the current induced in said stator flows back into said field winding so as to generate said mechanical braking torque over the intended range of operation of said alternator means, and
   current regulator means for regulating the amount of current which flows between said stator and said field winding as a function of a control signal in order to control the amount of said mechanical braking torque, wherein said current regulator means comprises means for sensing the current flowing through said field winding to produce said control signal.

8. The apparatus of claim 7, wherein said induced current is used for both exciting the field winding and generating the braking torque.

9. The apparatus of claim 7, wherein said current regulator means consists of a single load regulator.

10. The apparatus of claim 7, wherein said current regulator means comprises a pulse width modulator.

11. The apparatus of claim 10, wherein said current regulator means further comprises a field drive transistor for controlling the current from the stator to the field of said alternator means.

12. The apparatus of claim 7, wherein the amount of said mechanical braking torque is substantially a function of the square of said induced current.

13. The apparatus of claim 7, wherein substantially all of the mechanical energy represented by said mechanical input is dissipated thermally in said stator and field winding.

14. The apparatus of claim 1, wherein the amount of said mechanical braking torque is substantially a function of the square of said induced current.

15. The apparatus of claim 1, wherein substantially all of the mechanical energy represented by said mechanical input is dissipated thermally in said stator and field winding.

* * * * *